United States Patent
Reno et al.

(10) Patent No.: US 10,489,619 B2
(45) Date of Patent: Nov. 26, 2019

(54) INVENTORY SYSTEM FOR OBJECTS CONTAINED IN A SPACE BOUNDED BY AN ENCLOSURE AS WELL AS AN INVENTORY METHOD IMPLEMENTED BY SUCH AN INVENTORY SYSTEM

(71) Applicant: NEXESS, Mougins (FR)

(72) Inventors: Frédéric Reno, Mougins (FR); Jean-Anaël Monblanc, Mougins (FR); Plamen Iliev, Mougins (FR)

(73) Assignee: NEXESS, Mougins (FR)

( * ) Notice: Subject to any disclaimer, the term of this patent is extended or adjusted under 35 U.S.C. 154(b) by 0 days.

(21) Appl. No.: 15/532,310

(22) PCT Filed: Dec. 2, 2015

(86) PCT No.: PCT/EP2015/078331
§ 371 (c)(1),
(2) Date: Jun. 1, 2017

(87) PCT Pub. No.: WO2016/087502
PCT Pub. Date: Jun. 9, 2016

(65) Prior Publication Data
US 2017/0330001 A1   Nov. 16, 2017

(30) Foreign Application Priority Data
Dec. 2, 2014   (FR) ...................................... 14 61814

(51) Int. Cl.
*G06K 7/10* (2006.01)
*G06Q 10/08* (2012.01)
*G06K 7/00* (2006.01)

(52) U.S. Cl.
CPC ....... *G06K 7/10217* (2013.01); *G06Q 10/087* (2013.01); *G06Q 10/0875* (2013.01); *B60R 2325/105* (2013.01); *G06K 7/00* (2013.01)

(58) Field of Classification Search
CPC .......................... G06Q 10/087; G06Q 10/0875
See application file for complete search history.

(56) References Cited

U.S. PATENT DOCUMENTS

| | | | |
|---|---|---|---|
| 7,830,262 B1 | 11/2010 | Diorio et al. | |
| 2005/0156723 A1* | 7/2005 | Fujii | B60C 23/0408 340/447 |

(Continued)

OTHER PUBLICATIONS

Feb. 17, 2016 Written Opinion issued in International Patent Application No. PCT/EP2015/078331.

(Continued)

*Primary Examiner* — Laura N Nguyen
(74) *Attorney, Agent, or Firm* — Oliff PLC; R. Brian Drozd

(57) ABSTRACT

An inventory system for objects contained in a space bounded by an enclosure, said system including a tag fixed to each of the objects to be inventoried and a reading point provided with at least one antenna for emitting a wakeup electromagnetic wave confined inside said enclosure so that a tag, on receiving same, becomes active and then emits its identification data intended for said reading point, wherein the system includes means for controlling the emission power of said wakeup electromagnetic wave in accordance with a power-variation model defined by a series of emissions by said or each antenna in stages at power levels different from one stage to another in order to carry out said inventory. The present invention also relates to an inventory method implemented by such an inventory system.

9 Claims, 6 Drawing Sheets

(56) References Cited

U.S. PATENT DOCUMENTS

Figure 1:
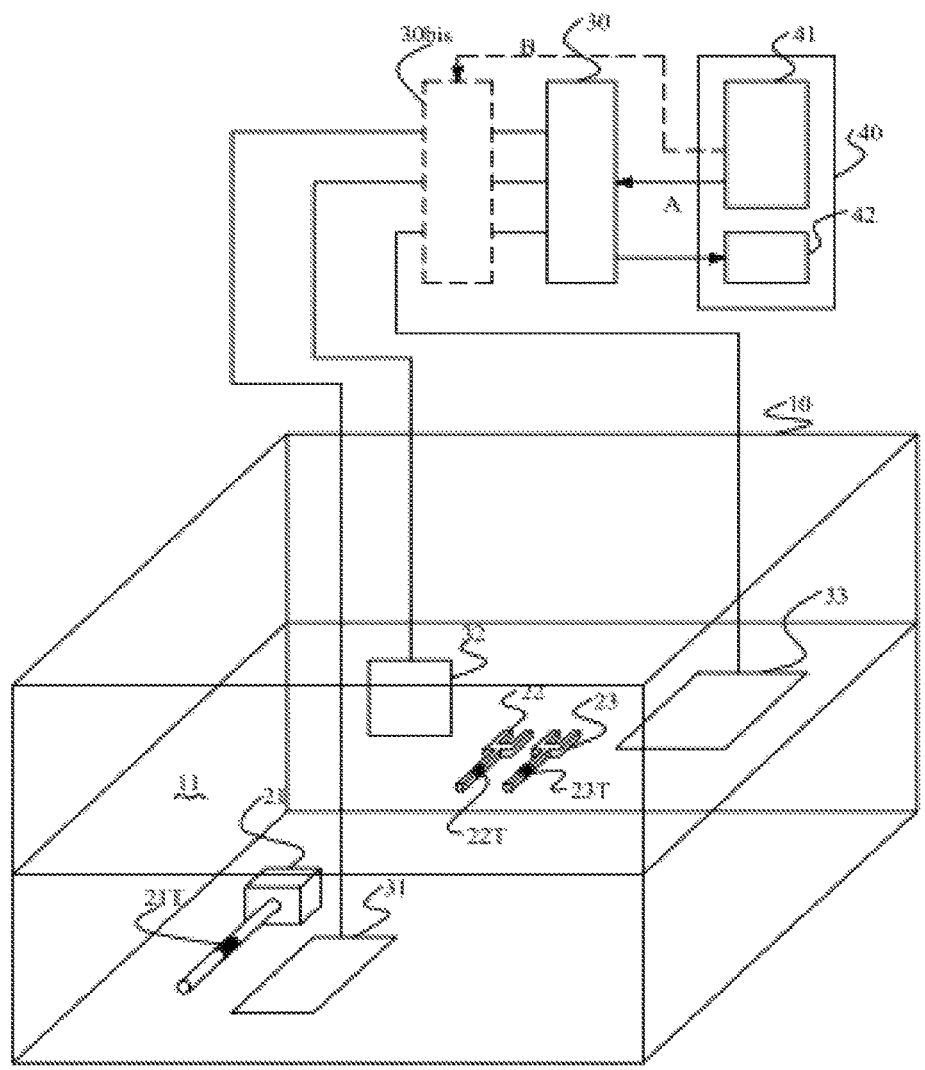

| | | | | |
|---|---|---|---|---|
| 2005/0280508 A1* | 12/2005 | Mravca | ............... | G06K 7/0008 |
| | | | | 340/10.2 |
| 2006/0044113 A1 | 3/2006 | Hashimoto et al. | | |
| 2006/0214773 A1 | 9/2006 | Wagner et al. | | |
| 2010/0045436 A1* | 2/2010 | Rinkes | .................... | H04Q 9/00 |
| | | | | 340/10.1 |
| 2010/0201520 A1* | 8/2010 | Stern | ...................... | G01S 13/75 |
| | | | | 340/572.1 |
| 2011/0080267 A1* | 4/2011 | Clare | .................... | G01S 13/82 |
| | | | | 340/10.4 |
| 2013/0106608 A1* | 5/2013 | Griesmann | ........ | G06K 7/10207 |
| | | | | 340/572.1 |
| 2014/0184391 A1* | 7/2014 | Elizondo, II | ....... | G06K 7/10356 |
| | | | | 340/10.1 |

OTHER PUBLICATIONS

Feb. 17, 2016 Search Report issued in International Patent Application No. PCT/EP2015/078331.

* cited by examiner

INVENTORY SYSTEM FOR OBJECTS CONTAINED IN A SPACE BOUNDED BY AN ENCLOSURE AS WELL AS AN INVENTORY METHOD IMPLEMENTED BY SUCH AN INVENTORY SYSTEM

The present invention relates to an inventory system for objects contained in the space bounded by an enclosure using radio-frequency wave identification (RFID) technology as well as an inventory method implemented by such an inventory system.

In general terms, a system using RFID technology consists of three types of element:
- at least one transponder, also referred to as a tag, consisting of an electronic circuit provided with an antenna for sending and receiving data in the form of radio-frequency waves, said circuit comprising at least one memory in which an identifier of said transponder is stored,
- a reading point also consisting of an electronic circuit provided with an antenna for sending and receiving data also in the form of radio-frequency waves, and
- a control unit connected to the reading point and using an application.

The functioning of such an RFID system is as follows. At the beginning of the identification procedure, the reading point emits a modulated electromagnetic wave, hereinafter referred to as a wakeup wave, intended for each tag in the system. On receiving it, a tag, situated in a coverage area where the electromagnetic field generated by the reading point is at a sufficiently high level, emerges from its standby state, becomes active and then sends an identification data item that is particular to it in the form of a modulated electromagnetic wave. This identification data item is received by the reading point, which then proceeds with the identification of the tag in question. The coverage area is generally between 0 and 7 metres in the direction of electromagnetic radiation of the antenna of the reading point. The latter may be provided with a plurality of antennas in order to increase the volume of the coverage area of the reading point.

Such an RFID system is described in the patent document US 2006/214773. In this document, in order to singularise the reading of the tags, the emission power of the wakeup electromagnetic wave is increased, from a minimum value, until the response of one or a few tags is obtained. As required, this emission power may be decreased.

One application of such an RFID system for carrying out inventories is described in the patent document U.S. Pat. No. 7,830,262.

In the application to an inventory system that is envisaged here, each tag is fixed to an object, such as a tool used for maintenance of a workshop, factory, etc. The objects to be inventoried are stored in a space, such an item of furniture, a tool truck or a cupboard, provided or not with shelves, drawers, etc. To carry out an inventory of these objects, it is necessary to confine the wakeup electromagnetic wave emitted by the reading point inside this space in order not to take into account in this inventory any tags that may be situated outside the item of furniture. To do this, this space is made impervious to the electromagnetic waves emitted by the reading point, for example by delimiting it by a metal enclosure. Thus only the tags inside this enclosure emit their identification data. Therefore only the objects stored in the enclosure are taken into account at the time of the inventory.

This type of inventory system is confronted with problems. Any object placed in the enclosure and also the walls thereof may act as reflectors for the electromagnetic waves emitted by the antenna or antennas of the reading point. Thus the direct waves and the reflected waves may interfere with each other and create power maxima and also minima in the enclosure. If a tag is situated at the point of a minimum, the power of the wakeup electromagnetic wave that it receives may be insufficient to make it active. It then does not emit its identification data and the reading point cannot therefore identify it. The inventory is erroneous.

In order to guarantee optimum distribution of the electromagnetic field radiated inside the metal enclosure, there exist various techniques that consist of optimising the positions and locations of the antennas of the reading point inside the enclosure. The aim is to determine the positions and number of antennas in order to ensure coverage of the wakeup electromagnetic wave over the whole of the internal volume of the enclosure with a power level sufficient to enable all the tags stored in the enclosure to become active and then to emit their own identification data.

Thus it is possible to guarantee a distribution of the electromagnetic field, inside the enclosure, of good quality and making it possible to identify any object stored whatever the location thereof.

When the objects to be inventoried themselves reflect the incident waves, because for example they are metal, which is generally the case with tools, they may further increase the phenomenon of interference described above. Unlike the previous case, the interferences thus created and therefore the topology of the power minima and maxima created depend themselves on the presence or absence of the objects in the enclosure. From one inventory to another, this topology may vary.

Thus the method proposed above is highly dependent on the objects, in particular metal ones, contained in the storage enclosure. The presence or absence of the metal objects in the space therefore modifies the distribution of the electromagnetic fields and therefore the quality of the identification.

The aim of the present invention is to provide an inventory system for objects contained in a metal enclosure that is such that it dispenses with the problems of interference mentioned above.

To do this, the present invention relates to an inventory system for objects contained in a space bounded by an enclosure, said system comprising a tag fixed to each of the objects to be inventoried and a reading point provided with at least one antenna for emitting a wakeup electromagnetic wave confined inside said enclosure so that a tag, on receiving same, becomes active and then emits its identification data intended for said reading point.

According to an essential feature of the present invention, said inventory system is characterised in that said reading point comprises means for controlling the emission power of said wakeup electromagnetic wave in accordance with a power-variation model relating to the configuration of the enclosure and objects that said enclosure (10) is supposed to contain at the time of the inventory, a power-variation model being defined by a series of emissions by said or each antenna in stages at power levels different from one stage to another in order to carry out said inventory.

According to an advantageous additional feature of the invention, said reading point is designed to function in a learning mode in which a power-variation model is established for each particular configuration of the enclosure and objects that it contains, said power-variation model used for carrying out said inventory being the one corresponding to the configuration of use of the enclosure and the objects that it contains. According to an additional advantageous feature of the invention, for each particular configuration of the enclosure and the objects that it contains, said power-variation model is established by selection from a set of predetermined power-variation models, said power-variation model selected being the one that is optimised for the configuration of use of the enclosure and objects in question.

According to another embodiment of the present invention, said inventory system comprises reference beacons placed at fixed points in said enclosure, said reading point being designed so as, on the basis of the identification data received from the reference beacons, to establish a map of active reference beacons, a map of active reference beacons being associated with each power-variation model established during the learning phase for each particular configuration of the enclosure and objects that it contains, the power-variation model used for carrying out said inventory being the one that is associated with the map of active reference beacons for the configuration of use of the enclosure and objects that it contains at the time of said inventory.

According to an advantageous additional feature of the invention, said means for controlling the emission power of said wakeup electromagnetic wave by said or each antenna consist of a control unit directly controlling said reading point to do this.

According to an advantageous additional feature of the invention, said means for controlling the emission power of said wakeup electromagnetic wave by said or each antenna comprise a power-control unit forming the interface between the antenna output or outputs of said reading point and said antenna or antennas.

The present invention also relates to an inventory method for objects contained in a space bounded by an enclosure by means of an inventory system comprising a tag fixed to each of the objects and a reading point provided with at least one antenna for emitting a wakeup electromagnetic wave confined inside said enclosure so that a tag, on receiving same, becomes active and then sends its identification data to said reading point. This method is characterised in that it comprises the following steps implemented by said reading point:
  a step of selecting a power-variation model defined by a series of emissions by said or each antenna in accordance with stages at power levels different from one stage to another, and of triggering the execution of said power-variation model selected,
  a step of reading identification data emitted by the tags following the activation thereof on reception of the various wakeup electromagnetic waves emitted by said antenna or antennas as said power-variation model is executed, and
  a step of processing the identification data received during said series of emissions.

According to an advantageous additional feature of the invention, said method comprises a learning phase during which a power-variation model is established for each particular configuration of the enclosure and objects that it contains, said power-variation model used for carrying out said inventory being the one corresponding to the configuration of use of the enclosure and the objects that it contains.

According to an advantageous additional feature of the invention, said learning phase comprises a step of selection, from a set of predetermined power-variation models, of the power-variation model which, for the configuration of the enclosure and objects that it contains, gives the optimum reading ratio compared with the other power-variation models in said set of models.

According to an advantageous additional feature of the invention, said learning phase comprises the following steps:
  a step of establishing a map of active reference beacons, and
  a step of determining the parameters of a power-variation model giving a reading ratio above a threshold level.

According to an advantageous additional feature of the invention, said learning phase comprises a step of determining the optimum duration of the model selected.

According to an advantageous additional feature of the invention, said learning phase comprises a step of verifying the repeatability of the inventory method for each of the power-variation models selected and optimised.

Figure 2:
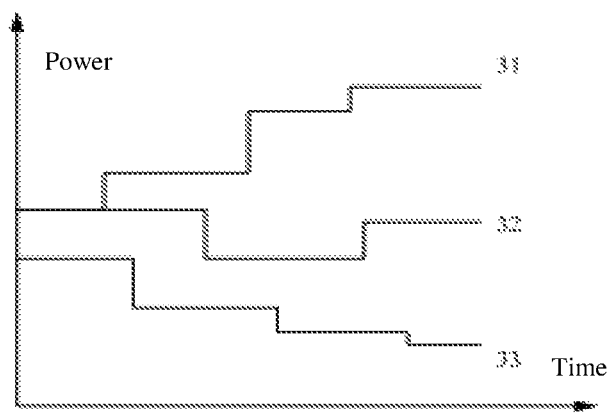
Figure 3:
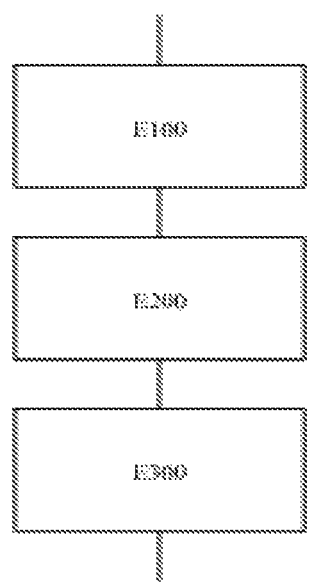
Figure 4:
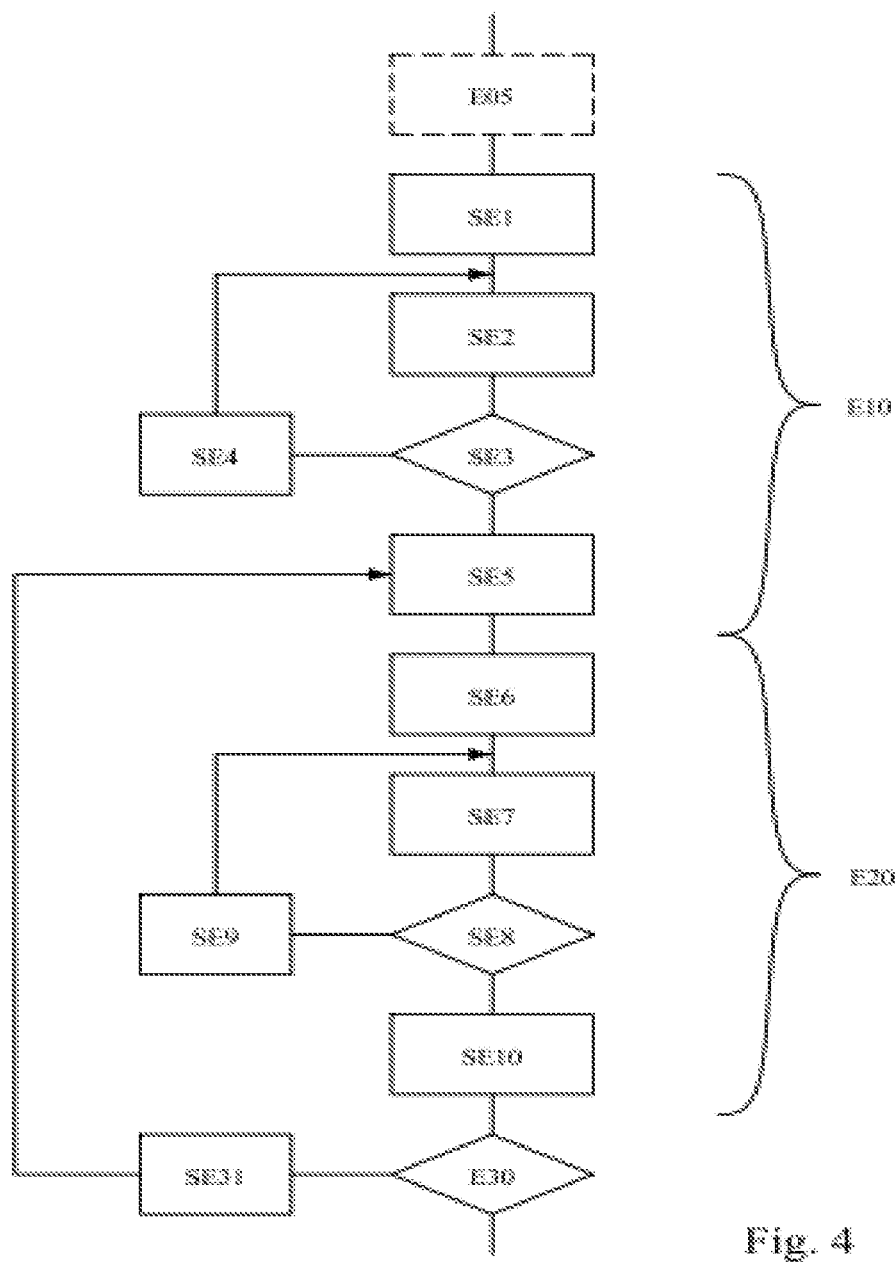
Figure 5:
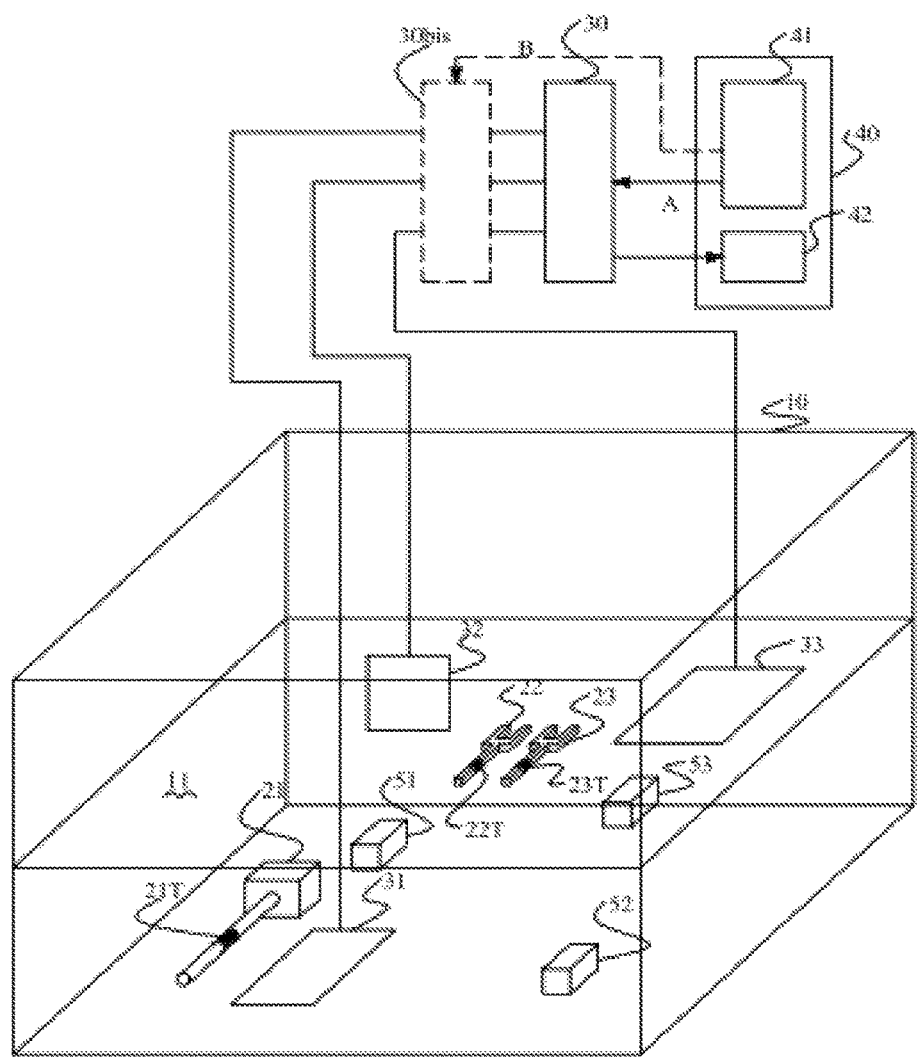
Figure 6:
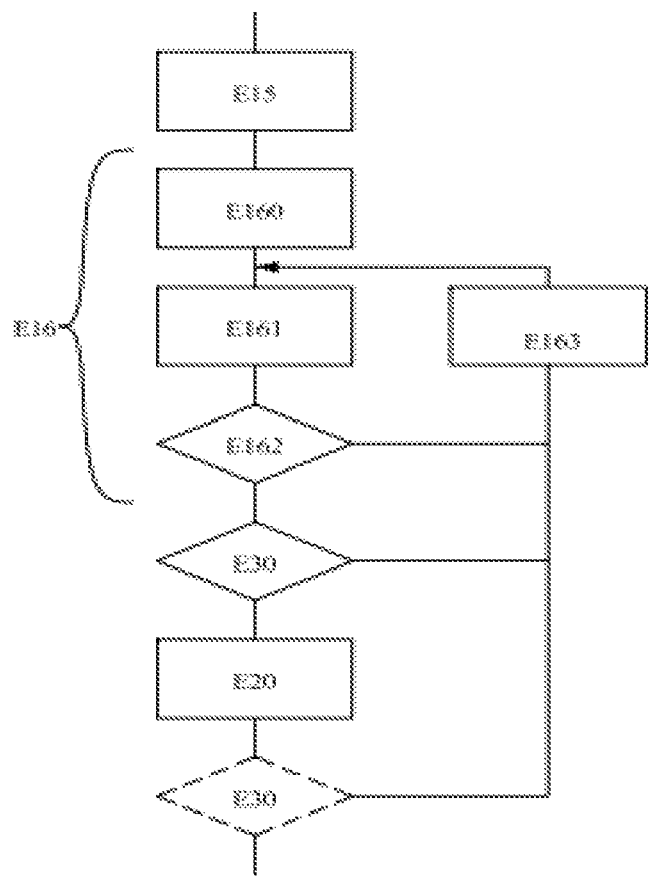
Figure 7:
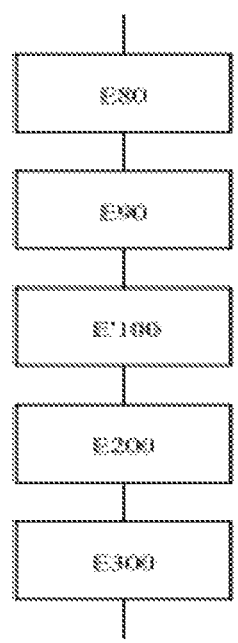

The features of the invention mentioned above, as well as others, will emerge more clearly from a reading of the following description of example embodiments, said description being given in relation to the accompanying drawings, among which:

FIG. 1 is a schematic view of an inventory system according to a first embodiment of the present invention, FIG. 2 is a diagram illustrating the power emitted by a reading point as a function of time according to an example of a power-variation model according to the present invention, FIG. 3 is a diagram illustrating an inventory method according to a first embodiment of the invention, FIG. 4 is a diagram illustrating the learning phase of an inventory method according to a first embodiment of the invention, FIG. 5 is a schematic view of an inventory system according to a second embodiment of the present invention, FIG. 6 is a diagram illustrating the learning phase of an inventory method according to a second embodiment of the invention, and FIG. 7 is a diagram illustrating an inventory method in its operating phase according to a second embodiment of the invention.

The inventory system shown in FIG. 1 is designed to inventory objects that are contained in a space such as an item of furniture, a cupboard or a workshop tool truck, which may contain elements, such as shelves, in this case by way of example, the shelf 11, drawers, boxes, etc. This space is bounded by an enclosure 10. Although this enclosure 10 has been shown as parallelepiped, the invention is not limited to this particular form.

The objects in question are for example tools (of generic reference 20) for providing maintenance of a workshop, factory, etc, such as the mallet 21 and the spanners 22 and 23 shown, which are each provided with an RFID (Radio Frequency IDentification) tag 20T, in this case the tags 21T, 22T and 23T.

The inventory system also comprises a reading point 30 provided with at least one antenna (here three antennas 31, 32 and 33 respectively on the bottom wall, the back wall and the shelf 11 of the enclosure 10) oriented so as to emit inside the enclosure 10. The antenna or antennas 31, 32 and 33 are positioned so that, having regard to the properties of the walls of the enclosure 10, such as their reflection or absorption of the electromagnetic waves in question, the electromagnetic waves that they emit are confined inside said enclosure 10 and are no longer present outside said enclosure 10.

The reading point 30 is for example connected to a processing system 40, such as a data-processing system or a computer, which comprises a control unit 41 for controlling the reading point 30 for the emission thereof and a processing unit 42 for in particular receiving data from said reading point 30, for example identification data of the tags 20T contained in the enclosure 10, in accordance with a specific application.

As already mentioned in the preamble of the present description, the operating principle of such an RFID system is as follows. At the commencement of the identification procedure, the reading point 30 emits, by means of its antenna or antennas 31, 32 and 33, a modulated electromagnetic wave, referred to as a wakeup wave, intended for each tag 20 in the system (here the tags 21T, 22T and 23T). On reception thereof, a tag 20T, situated in the coverage area where the electromagnetic field generated by the antennas 31, 32 and 33 of the reading point 30 is at a sufficiently high level, comes out of its standby state and thus becomes active. It then emits an identification data item that is particular to it in the form of a modulated electromagnetic wave. This identification data item is received by the reading point 30 which, for example, transmits it to the processing unit 42 of the processing system 40 for subsequent processing in accordance with an application of said system 40.

According to the invention, the control unit 41 is provided for controlling the emission power of said wakeup electromagnetic wave emitted by the or each antenna 31, 32, 33 of the reading point 30 so that this power is in accordance with a power-variation model from a set of previously determined power-variation models, each power-variation model being related to a particular configuration of the enclosure 10 and objects 20 that said chamber 10 is supposed to contain at the time of the inventory.

To do this, two embodiments are envisaged. In the first, the control unit 41 directly controls the reading point 30 (arrow A) so that its antennas 31, 32 and 33 respectively emit wakeup electromagnetic waves in accordance with a given power-variation model. For example, the control unit 41 is a software unit of the processing system 40.

In the second embodiment shown in broken lines in FIG. 1, the control unit 41 controls (arrow B) a power-control unit 30bis so that the antennas 31, 32 and 33 respectively emit wakeup electromagnetic waves in accordance with a given power-variation model. The power-control unit 30bis is advantageously a hardware unit that forms the interface between the antenna outputs of the reading point 30 and the antennas 31, 32 and 33. It consists for example of variable-gain amplifiers (not shown) themselves controlled by signals in accordance with the power-variation model selected by the control unit 41. The control unit 41 also controls the reading point 30, either so that its antenna outputs are at constant power, or so that its antenna outputs also follow a power-variation model.

A power-variation model for the electromagnetic waves emitted by the antennas 31, 32, 33 of said reading point 30 is defined by a series of emissions by the or each antenna (here 31, 32 and 33) according to stages at power levels different from one stage to another and from one antenna to another, if a plurality of antennas exist. In FIG. 2, three curves can be seen, corresponding respectively to three different power-variation models, comprising stages with different powers and durations for respectively the three antennas 31, 32 and 33 of the inventory system of FIG. 1. Whereas for the antenna 31 the emission power level increases at each stage, for the antenna 32 it remains constant and then decreases to the following stage and next increases to the last stage. For the third antenna 33, the emission power level decreases at each stage.

Thus, at each change in the emission power of the wakeup wave on an antenna, new power minima and maxima are created, in positions that are also new. New tags can then be acted on by the wakeup wave. Following these changes, for the complete execution of a given power-variation model, a certain number of tags have been acted on and have become active, at one moment or another in this execution. A more or less large part of the internal space of said enclosure 10 is swept by these wakeup electromagnetic waves, the power of which is sufficient to make active the tags 20T of the objects 20 contained in this space. The power-variation model that is adopted to carry out the inventory is the one where this space corresponds to the internal space of the enclosure 10.

An inventory system according to the present invention is designed to function first of all in a learning phase and then subsequently in an operating phase.

In the learning phase, a power-variation model is determined that is optimised for a particular configuration of the enclosure 10 and objects 20 (provided with their tags) that is the one that is the object of the learning.

A configuration of the enclosure 10 is defined by the presence or absence of a shelf, a drawer, a box, etc in the item of furniture that constitutes the enclosure. A configuration of the objects 20 is defined by the number of objects, of a particular type, for example: mallet, flat spanner, Allen key, screwdriver, etc, placed at particular points in the enclosure 10.

The power-variation model that is optimised for a particular configuration of the enclosure 10 and objects 20 is first of all selected from a set of predetermined models as the one that gives the best reading ratio for the configuration of the enclosure and objects in question and is next optimised by determining an optimum reading duration. It is also the one that allows repeatability of the inventory carried out for this configuration.

The reading ratio is the ratio of the number of tags 20T read by the reading point 30 to the number of tags 20T present in the enclosure 10.

The optimum reading duration is the duration beyond which the number of tags read no longer increases significantly even for a continuation of the reading over a long period.

The inventory repeatability of a given power model is obtained when, for a particular configuration, the number of tags read is identical or almost identical for a given number of repeated inventories, for example 10.

In the operating phase, the power-variation model that was determined and optimised for the particular configuration of the enclosure 10 and objects 20 during the learning phase is used to carry out the inventories.

FIG. 3 is a diagram showing the various steps implemented by an inventory method for objects according to the present invention for a given configuration of the enclosure 10 and objects 20, during its operating phase. This method is implemented by the reading point 30 in FIG. 1. It comprises:

a step E100 of selecting a power-variation model from a set of previously determined power-variation models, each power-variation model being defined by a series of emissions by said or each antenna on stages with power levels and durations different from one stage to another, and of triggering the execution of said power-variation model, a step E200 of reading identification data emitted by the tags following the activation thereof on reception of the various wakeup electromagnetic waves emitted by said reading point 30 as said power-variation model is executed, and a step E300 of processing the identification data previously read.

This processing of step E300 may consist of cataloguing all the objects that are present in the item of furniture that constitutes the enclosure 10. This processing also enables the user to view the result of the inventory.

Step E100 is for example implemented by the control unit 41 of the processing system 40. Steps E200 and E300 are for example implemented by the processing unit 42.

FIG. 4 is a diagram showing the various steps implemented by an inventory method during its learning phase. It comprises a step E10 of selecting, from a predetermined set of power-variation models $M_1$ to $M_N$, the optimised power-variation model which, for the configuration of the enclosure 10 and objects 20 in question, gives the optimum reading ratio compared with the other power-variation models of said set of models.

In a variant embodiment, prior to step E10, a step E05 determines the set of power-variation models from which step E10 selects the optimised power-variation model. For example, step 05 consists of determining the number of tags 20 read by the reading point 30 during a standard inventory $M_S$ carried out at constant power for a standard time $t_S$. If this number is small, the set of models determined at step 05 will contain models with high power variations and in a fairly high number. On the other hand, if this number is high, the set of models determined at step 05 will contain models with small power variations and in a fairly small number.

This step E10 comprises the following substeps:
- a substep SE1 of selecting a power-variation model $M_n$ from the predetermined power-variation models $M_1$ to $M_N$,
- a substep SE2 of carrying out an inventory $I(M_n, t_s)$ by applying said power-variation model $M_n$ selected and of determination of the reading ratio of tags $\tau_n$ for this inventory $I(M_n, t_s)$ (NB: the duration of implementation of the inventory is $t_s$, a standard predetermined duration),
- a substep SE3 of checking that all the predetermined power-variation models $M_1$ to $M_N$ have been applied. If such is not the case, the substep SE4 of selecting another predetermined power-variation model is implemented, and then once again substep SE2, etc, if all the predetermined power-variation models $M_1$ to $M_N$ have been applied, a substep SE5 of classifying the predetermined power-variation models $M_1$ to $M_N$ according to their respective reading ratios $\tau_1$ to $\tau_N$ and of selection of the one, referred to as the selected power-variation model $M_{max}$ that gave rise to the highest tag reading ratio $\tau_{max}$.

Said learning phase may also comprise a step E20 of determining the optimum duration $t_{opt}$ of the power-variation model $M_{max}$ selected at substep SE5. This optimum duration $t_{opt}$ is the duration beyond which the number of tags read no longer increases significantly. It may also be shorter than a maximum duration $t_{Max}$ even if the number of tags read increases significantly with time. This maximum duration $t_{Max}$ can for example be configured by the user, according to his desiderata.

This step E20 comprises the following substeps:
- a substep SE6 of selecting a duration $t_i$ of implementation of the selected power-variation model $M_{max}$ from a set of predetermined durations $t_1$ to $t_I$ (which may be also less than or equal to $t_{Max}$),
- a substep SE7 of carrying out an inventory $I(M_{max}, t_i)$ by applying said selected power-variation model $M_{max}$ for the selected duration $t_I$ and of determining the tag reading ratio $\tau_1$ of this inventory $I(M_{max}, t_i)$,
- a substep SE8 of checking that all the predetermined durations have been selected. If such is not the case, the substep SE9 of selecting another duration is implemented, and then substep SE7 is implemented,
- a substep SE10, implemented if all the predetermined durations $t_1$ to $t_I$ have been selected, of determining the optimum duration $t_{opt}$ beyond which the number of tags read no longer increases significantly even for a long duration. If a duration $t_{opt}$ cannot be determined since the reading ratio is still increasing with time, the optimum duration will be the value $t_{Max}$.

It may also comprise a step E30 of verifying the repeatability of the inventory method for the selected power-variation model $M_{max}$ used during the optimised duration $t_{opt}$. Thus, if a plurality of inventories $I(M_{max}, t_{opt})$ are carried and do not give a reading ratio lying in a predetermined range and a function of the standard deviation, a substep SE31 is performed of withdrawing the model $M_{max}$ in question from the list of models present at substep SE5, which is once again implemented to select from this truncated list the power-variation model that now gives the highest reading ratio. Steps E20 and E30 are once again implemented with this new model $M_{max}$.

If at the end of these steps E20 and E30 no power-variation model among the models $M_1$ to $M_N$ has been adopted, then the model ultimately taken into account is the standard model $M_S$ with constant power and the inventory is carried for a standard duration $t_S$.

The triggering of the learning phase is effected when the inventory system is first started up, or on demand by the user.

The inventory system shown in FIG. 5 is identical to the one in FIG. 1 except for the fact that it also comprises reference beacons 50 (in this case 51, 52 and 53) that are placed at fixed points inside said enclosure 10. These reference beacons 50 are tags which are for example fixed to the internal face of the walls of the enclosure 10 or on fixed elements thereof, such as boxes, shelves or drawers contained in the enclosure 10. The identification data of these tags are specific so that the reading point 30 can differentiate them from the tags of the objects to be inventoried.

After emission of the wakeup electromagnetic wave, the reference beacons 50 that are situated in a coverage area where the electromagnetic field generated by the antennas 31, 32 and 33 of the reading point 30 is at a sufficiently high level are activated and then emit their own identification data, the other beacons not receiving an electromagnetic field of sufficient level not being activated. The reading point 30 is then in a position to establish a map of the reference beacons 50 that are active, that is to say which have responded to the wakeup electromagnetic wave emitted by the reading point 30.

As before for the embodiment in FIG. 1, the inventory system of FIG. 5 is designed so as to function first of all in a learning phase and then subsequently in an operating phase.

During the learning phase, for a particular configuration of the enclosure 10 and objects 20 (provided with their tags), there is first of all established a map of the reference beacons 50 that are active and secondly there is determined an optimised power-variation model that will be associated with said map established. This learning phase according to this second embodiment is described in relation to FIG. 6. It comprises the following steps:

a step E15 of establishing a map of active reference beacons $C_c$ for the configuration of the enclosure 10 and objects 20 in question. This step is performed using a standard model of constant power over a standard duration $t_S$, a step E16 of determining an optimised power-variation model $M_{opt}$ (in particular of determining parameters of said model) giving a reading ratio higher than a threshold ratio, for example 99%.

The step of determining the parameters comprises the following substeps:

a substep E160 of selecting a power-variation model $M_P$ from a predetermined set of power-variation models, said power-variation model $M_P$ corresponding a priori to the configuration of the enclosure 10 and objects in question, a substep E161 of carrying out an inventory $I(M_P, t_s)$ using said power-variation model $M_P$ for a standard predetermined time $t_S$, and a substep E162 of checking that the reading ratio is higher than a threshold ratio, for example 99%. If such is not the case, the parameters of the power-variation model $M_P$ are modified (substep E163), for example in increments or decrements, and the model becomes $M_{Pm}$. Steps E161 and E162 are once again implemented for the model $M_{Pm}$ and the time $t_S$. If such is the case, the power-variation model $M_P$ or $M_{Pm}$ that was used for carrying out the last inventory is kept and is associated with the established map $C_c$ at step E15 for the configuration of the enclosure 10 and objects 20 in question.

The power-variation model $M_P$ selected at step E160 from a predetermined set of power-variation models may be selected according to the number of tags read during a standard inventory $I(M_S, t_S)$, like step E05 of the first embodiment.

As before, said learning phase may also comprise a step E30 of verifying the repeatability of the inventory method for the optimised model $M_{Sm}$ and a step E20 of determining the optimum duration $t_{opt}$ of the selected model $M_{Sm}$. Step E30 may be repeated for the optimised model $M_{Sm}$ for the optimum duration $t_{opt}$.

These steps E20 and E30, being identical to those of the first embodiment, are not described again.

The inventory method in its operating phase implemented by the reading point 30 is the following one described in relation to FIG. 7. The reading point 30 has available a plurality of power-various models, with each of which there has been associated a map of the reference beacons 50 active during the learning phase. The inventory method according to the invention then comprises:

a step E80 of establishing a map of the reference beacons 50 active at the time in question, and a step E90 of selecting the power-variation model that is associated with the map of the active reference beacons 50 established at step E80.

These steps E80 and E90 are followed by step E'100 of triggering the execution of the power-variation model that was selected at step E90 and steps E200 and E300 identical to those described previously and which, because of this, are not described again.

The invention claimed is:

1. An inventory system for objects contained in a space bounded by an enclosure, said system comprising:

a tag fixed to each of the objects to be inventoried and a reading point provided with at least one antenna for emitting a wakeup electromagnetic wave confined inside said enclosure so that said tag, on receiving same, becomes active and then emits its identification data intended for said reading point, wherein said reading point comprises circuitry causing the system to implement controlling the emission power of said wakeup electromagnetic wave in accordance with a power-variation model relating to a configuration of the enclosure and objects that said enclosure is supposed to contain at the time of the inventory, the configuration of the enclosure and objects being defined by a configuration of the enclosure that is defined by the presence or absence of elements of the enclosure and by a configuration of objects, a type and/or number of objects, the power-variation model being defined by a series of emissions by said or each antenna in stages at power levels different from one stage to another in order to carry out said inventory, said reading point is designed to function in a learning mode in which the power-variation model is established for each particular configuration of the enclosure and objects that it contains, said power-variation model used for carrying out said inventory being the one corresponding to the configuration of the enclosure and the objects that it contains, said learning mode causes said reading point to perform determining an optimum duration of the selected power-variation model, the optimum duration is the duration beyond which the number of tags read no longer increases.

2. The inventory system according to claim 1, wherein for each particular configuration of the enclosure and the objects that it contains, said power-variation model is established by selection from a set of predetermined power-variation models, said power-variation model selected being the one that is optimised for the configuration of the enclosure and objects.

3. The inventory system according to claim 1, wherein the inventory system comprises reference beacons placed at fixed points in said enclosure, in that said reading point is designed so as, on the basis of the identification data received from the reference beacons, to establish a map of active reference beacons, in that the map of active reference beacons is associated with each power-variation model established during the learning phase for each particular configuration of the enclosure and objects that it contains, and in that the power-variation model used for carrying out said inventory is the one that is associated with the map of active reference beacons for the configuration of the enclosure and objects that it contains at the time of said inventory.

4. The inventory system according to claim 1, wherein controlling the emission power of said wakeup electromagnetic wave by said or each antenna is performed by a control unit directly controlling said reading point to do this.

5. The inventory system according to claim 1, wherein said controlling the emission power of said wakeup electromagnetic wave by said or each antenna is performed by a power-control unit forming an interface between an antenna output or antenna outputs of said reading point and said antenna or antennas.

6. An inventory method for objects contained in a space bounded by an enclosure by an inventory system comprising a tag fixed to each of the objects and a reading point provided with at least one antenna for emitting a wakeup electromagnetic wave confined inside said enclosure so that the tag, on receiving same, becomes active and then sends its identification data to said reading point, wherein said method causing said reading point to perform:

selecting a power-variation model relating to a configuration of the enclosure and objects that said enclosure is supposed to contain at the time of the inventory, the configuration of the enclosure and objects being defined by a configuration of the enclosure that is defined by the presence or absence of elements of the enclosure that may contain objects and by a configuration of objects, a type and/or number of objects, the power-variation model being defined by a series of emissions by said or each antenna in accordance with stages at power levels different from one stage to another, and triggering the execution of said power-variation model selected, said reading point is designed to function in a learning phase in which the power-variation model is established for each particular configuration of the enclosure and objects that it contains, said power-variation model used for carrying out said inventory being the one corresponding to the configuration of the enclosure and the objects that it contains, said learning phase causes said reading point to perform determining an optimum duration of the selected power-variation model, the optimum duration is the duration beyond which the number of tags read no longer increases;

reading identification data emitted by the tags following the activation thereof on reception of the various wakeup electromagnetic waves emitted by said antenna or antennas as said power-variation model is executed, and processing the identification data received during said series of emissions.

7. The inventory method according to claim 6, said learning phase causes said reading point to perform selecting, from a set of predetermined power-variation models, of the power-variation model which, for the configuration of the enclosure and objects that it contains, gives an optimum reading ratio compared with the other predetermined power-variation models in said set of predetermined power-variation models.

8. The inventory method according to claim 7, wherein during said learning phase said method causes said reading point to perform:
   establishing a map of active reference beacons, and
   determining parameters of the power-variation model giving a reading ratio above a threshold level.

9. The inventory method according to claim 7, wherein said learning phase causes said reading point to perform verifying a repeatability of the inventory method for each of the power-variation models selected and optimised.

* * * * *